(12) United States Patent  
Cisneros

(10) Patent No.: US 6,349,452 B1
(45) Date of Patent: Feb. 26, 2002

(54) SAFETY STRAP ON ELECTRICAL CORD

(76) Inventor: Gustavo A. Cisneros, 11961 SW. 97th Ter., Miami, FL (US) 33186

( * ) Notice: Subject to any disclaimer, the term of this patent is extended or adjusted under 35 U.S.C. 154(b) by 0 days.

(21) Appl. No.: 09/636,679

(22) Filed: Aug. 11, 2000

(51) Int. Cl.[7] .......................... B65D 33/00; F16G 11/00; H01B 7/00; H01R 11/00
(52) U.S. Cl. ....................... 24/306; 24/16 PB; 24/16 R; 24/304; 174/68.1; 174/135; 439/502
(58) Field of Search ............................... 24/16 R, 16 PB, 24/306, 17 AP, 304, 442, 30.5 R, 30.5 P; 248/74.3; 174/135, 136, 68.1, 117 A, 72 A, 72 R, 79, 74 A; 439/369, 370, 371, 373, 502; 128/DIG. 15

(56) References Cited

U.S. PATENT DOCUMENTS

| 4,182,005 A | 1/1980 | Harrington |
| 4,780,935 A | 11/1988 | Palombit |
| 4,910,835 A | 3/1990 | Carpenter |
| 4,991,265 A | 2/1991 | Campbell et al. |
| 5,031,282 A | 7/1991 | Denaro |
| 5,048,158 A | 9/1991 | Koerner |
| 5,075,932 A | 12/1991 | Hunt et al. |
| 5,147,216 A | * 9/1992 | Shotey .................... 439/369 X |
| 5,502,877 A | 4/1996 | Yocum |
| 5,534,665 A | * 7/1996 | Long ......................... 174/72 A |
| 5,560,564 A | 10/1996 | Maynard |
| 5,732,445 A | 3/1998 | Stodolka et al. |
| 5,881,436 A | * 3/1999 | Lyons .......................... 24/16 R |
| 5,906,507 A | * 5/1999 | Howard ....................... 174/135 |

* cited by examiner

Primary Examiner—Robert J. Sandy
(74) Attorney, Agent, or Firm—Thomas R. Vigil

(57) ABSTRACT

The safety strap comprises a first strap portion and a second strap portion and two spaced projections extending upwardly from the safety strap for being received around and fixed to an electrical cord by one of an adhesive or a heat sealing, and the strap portions having mating releasable fastening structure thereon.

5 Claims, 1 Drawing Sheet

SAFETY STRAP ON ELECTRICAL CORD

BACKGROUND OF THE INVENTION

1. Field of the Invention

The present invention relates to a safety strap which is mounted on an electrical cord and which is utilized for gathering and holding coils of the cord together.

2. Description of the Prior Art

Heretofore various electrical cord holders, retainers and straps have been proposed and examples of previously proposed analogous and non-analogous holders, straps, retainers, etc. for holding coiled items are disclosed in the following analogous and non-analogous U.S. patents:

| U.S. Pat. No. | Patentee |
| --- | --- |
| 4,182,005 | Harrington |
| 4,780,935 | Palombit |
| 4,910,835 | Carpenter |
| 4,991,265 | Campbell et al. |
| 5,031,282 | Denaro |
| 5,048,158 | Koerner |
| 5,075,932 | Hunt et al. |
| 5,502,877 | Yocum |
| 5,560,564 | Maynard |
| 5,732,445 | Stodolka et al. |

SUMMARY OF THE INVENTION

According to the teachings of the present invention there is provided a safety trap comprising a first strap portion and a second strap portion and two spaced projections extending upwardly from the safety strap for being received around and fixed to an electrical cord by one of an adhesive or a heat sealing, and the strap portions having mating releasable fastening structure thereon.

DESCRIPTION OF THE PREFERRED EMBODIMENT(S)

Figure 1:
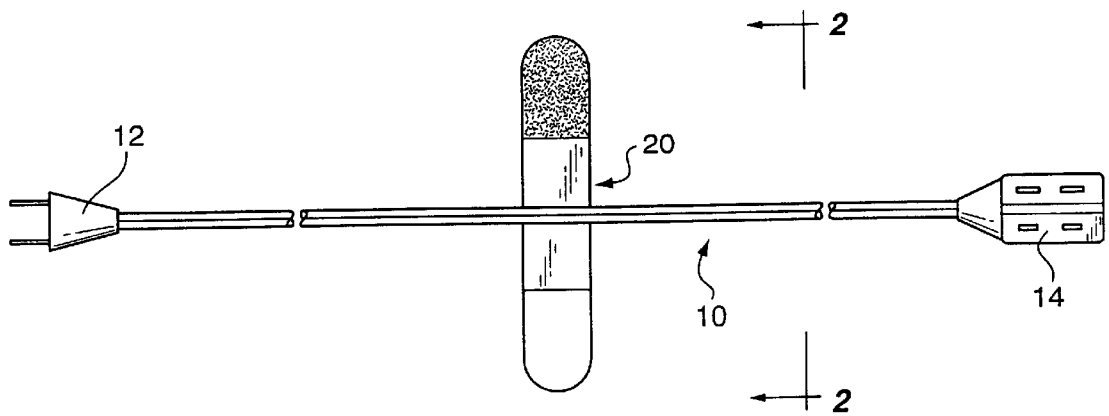
FIG. 1 is a plan view of the safety strap of the present invention fixed to a two wire conductor electrical cord.

Referring now to the drawings in greater detail, there is illustrated in FIG. 1 an electrical extension cord 10 with portions thereof broken away. The cord 10 has a male plug 12 at one end and a female receptacle 14 at the other end.

Figure 2:
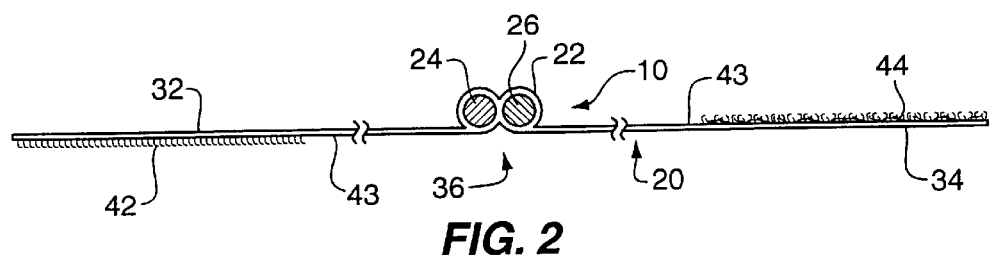
FIG. 2 is a sectional view through the cord and the safety strap of the present invention shown in FIG. 1 and is taken along line 2—2 of FIG. 1.

As shown in FIGS. 1 and 2, the safety strap 20 of the present invention is fixed to (with an adhesive) or integral with (heat fused to) the insulation 22 surrounding the wire conductors 24 and 26 in the cord 10. FIG. 2 shows a direct sealing of the strap 20 to the cord 10.

While FIGS. 1 and 2 illustrated one preferred embodiment of the invention, it is to be understood that for manufacturing purposes, the strap 20 can be fixed to or adjacent the plug 12 or receptacle 14.

Figure 3:
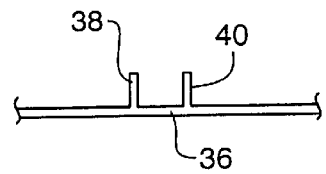
FIG. 3 is a fragmentary sectional view of middle portion of one embodiment of the safety strap before the strap is fixed to an insulated electrical cord.

The strap 20 includes first and second two strap portions 32 and 34 (as shown in FIG. 2) connected to a middle portion 36 which can have two projections 38 and 40 extending upwardly from the middle portion 36 of the strap 20 (as shown in FIG. 3) for being received about the electrical cord 10. Then, the upper ends of the two projections 38 and 40 are folded over or pressed over the cord with an adhesive, or heat is applied to the folded over projections 38 and 40, to glue or heat fuse the strap 20 to the cord 10 to end up with the construction illustrated in FIG. 2.

According to the teachings of the present invention, the strap 20 includes the first strap portion 32 having a loop and hook material 42 (sold under the trademark Velcro™) on a lower or outer side 43 of the first strap portion 32 which is on the left hand side of the strap 20 shown in FIG. 2. Then, the second strap portion 34 has a mating hook and loop material 44 (sold under the trademark Velcro™) on an upper or inner side 45 of the second strap portion.

Figure 4:
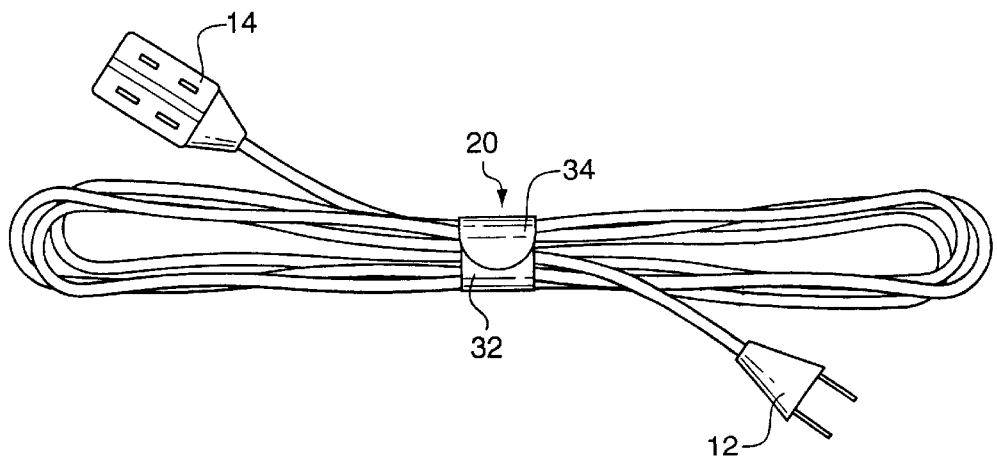
FIG. 4 is a perspective view of the two strap portions of the safety strap of the present invention wrapped around a coiled electrical cord.

With this construction, the first strap portion 32 is first folded over loops or coils 46 (shown in FIG. 4) of the cord 10 with the hook and loop material 42 facing upwardly. Then the second strap portion 34 is folded over the loops or coils 46 so that the hook and loop material 44 will face downwardly and engage the hook and loop material 42 on the other first strap portion 32. This construction is shown In FIG. 4 where the electrical cord 10 is coiled up and the strap portions 32 and 34 are folded one on the other and fixed together by the hook and loop material to hold the coiled cord 10 together.

The safety strap 20 is typically made of a plastic material onto which hook and loop material is fixed. In this way, the safety strap 20 of the present invention can be mounted in the middle of the electrical cord 10 or adjacent the plug 12 or the receptacle 14 and provides a cord holding structure which is always on the cord 10 ready for use whenever the cord is coiled.

From the foregoing description, it will be appreciated that the safety strap 20 of the present invention has a number of advantages, some of which have been described above and others of which are inherent in the invention. Also, it is to be understood that modifications can be made to the safety strap of the present invention without departing from the teachings thereof. For example, instead of being used with a double wire conductor cord 10, as shown in the Figures, the two or more wires in the cord can be surrounded by a cylindrical sleeve or sheath of insulation, as shown on the cord 10 in FIG. 4. Then, of course, the two projections 38 and 40 shown in FIG. 3 will be folded about or around the cylindrical cord 10 for mounting the safety strap 20 to the cord 10.

Accordingly, the scope of the invention is only to be limited as necessitated by the accompanying claims.

I claim:

1. A safety strap comprising a first strap portion and a second strap portion and two spaced projections extending upwardly from said safety strap for being received around and fixed to an electrical cord by one of an adhesive or a heat sealing, and said strap portions having mating releasable fastening means thereon.

2. The safety strap of claim 1 wherein said first strap portion has a hook and loop material on a lower or outer side thereof and said second strap portion has hook and loop material on an upper or inner side thereof whereby, after the cord is coiled, said first strap portion is folded over the cord so that said hook and loop material on the underside thereof faces outwardly and then said second strap portion is folded over said first strap portion so that said hook and loop material on said second strap portion will engage said hook and loop material on said first strap portion thereby to releasably fix said strap portions together about a coiled electrical cord.

3. The safety strap of claim 1 being fixed to the electrical cord intermediate the ends thereof.

4. The safety strap of claim 1 being fixed to the electrical cord at or adjacent a plug end of the cord.

5. The safety strap of claim 1 being fixed to the electrical cord at or adjacent a receptacle end of the cord.

\* \* \* \* \*